United States Patent [19]

Loucks et al.

[11] 4,156,771

[45] May 29, 1979

[54] PROCESS OF FORMING HETEROCYCLIC-COUPLED BLOCK POLYMERS OF POLYPHENYLENE OXIDE

[75] Inventors: George R. Loucks, Scotia; Dwain M. White, Schenectady, both of N.Y.

[73] Assignee: General Electric Company, Schenectady, N.Y.

[21] Appl. No.: 807,990

[22] Filed: Jun. 20, 1977

[51] Int. Cl.$^2$ .................. C08G 65/44; C08G 65/48
[52] U.S. Cl. .................................. 528/213; 528/212; 528/214; 528/215
[58] Field of Search ......... 260/47 ET, 47 CZ, 47 CP, 260/61; 528/213, 212, 214, 215

[56] References Cited

U.S. PATENT DOCUMENTS

| | | | |
|---|---|---|---|
| 3,297,639 | 1/1967 | Picklesimer et al. | 260/61 |
| 3,733,302 | 5/1973 | Klebe et al. | 260/47 ET |
| 3,753,946 | 8/1973 | Holub et al. | 260/47 CZ |
| 3,773,718 | 11/1973 | Klebe et al. | 260/47 ET |
| 3,978,028 | 8/1976 | Sundermann et al. | 260/61 |

*Primary Examiner*—Lester L. Lee
*Attorney, Agent, or Firm*—F. Wesley Turner; Joseph T. Cohen; Charles T. Watts

[57] ABSTRACT

A process of forming heterocyclic-coupled linear, branched and/or cross-linked polymers of polyphenylene oxides is described which comprises contacting heterocyclic halides with (a) polyphenylene oxides having an average hydroxyl group per molecule value greater than zero including 1.0 or less, or (b) quinone-coupled polyphenylene oxides having an average hydroxyl group per molecule value greater than zero including 2.0 or less, including mixtures of (a) and (b).

11 Claims, No Drawings

PROCESS OF FORMING HETEROCYCLIC-COUPLED BLOCK POLYMERS OF POLYPHENYLENE OXIDE

CROSS REFERENCE TO RELATED APPLICATIONS

This invention is related to subject matter disclosed in our copending U.S. applications, Ser. Nos. 800,645, 800,646, 800,647, 800,648, all filed on May 26, 1977. All of the aforesaid applications are also our inventions and are assigned to the same assignee as the assignee of this application. All of the disclosures referenced above are incorporated herein in their entirety by reference.

BACKGROUND OF THE INVENTION

1. Field of the Invention

This invention relates to a process of forming phosphorus containing linear, branched, and/or cross-linked polymers of polyphenylene oxides which comprises contacting phosphoryl halides with (a) polyphenylene oxides having an average hydroxyl group per molecule value greater than zero including 1.0 or less, or (b) quinone-coupled polyphenylene oxides having an average hydroxyl group per polymer molecule value greater than zero including 2.0 or less, including mixtures of (a) and (b).

2. Description of the Prior Art

Self-condensation reactions of certain phenols employing oxygen in combination with an effective oxidative coupling catalyst system to form prior art polyphenylene oxides, i.e., polyphenylene oxides having an average hydroxyl group per molecule of 1.0 or less, are described in various U.S. patent applications including Hay's U.S. Pat. Nos. 3,306,879, 3,914,266, application Ser. No. 540,473, filed Jan. 13, 1975, a continuation-in-part of Ser. No. 441,295, filed Feb. 11, 1974, now abandoned, and Olander's U.S. Pat. Nos. 3,956,442; 3,965,069; 3,972,851 and Ser. No. 582,910, filed June 2, 1975.

Block polymers of prior art polyphenylene oxides employing simple bifunctional coupling compounds such as diacyl halides, diisocyanates, bis(haloaryl)sulfones are described in White's U.S. Pat. Nos. 3,793,564; 3,770,850 and 3,809,729.

DESCRIPTION OF THE INVENTION

This invention embodies a process of forming heterocyclic coupled linear, branched, and/or cross-linked polymers of polyphenylene oxides which comprises contacting heterocyclic halides with (a) polyphenylene oxides having an average hydroxyl group per molecule value greater than zero including 1.0 or less, or (b) quinone-coupled polyphenylene oxides having an average hydroxyl group per molecule value greater than zero including 2.0 or less, including mixtures of (a) and (b).

The polyphenylene oxides that are employed in our process can be prepared by any of the methods known to those skilled in the art including those described in the Hay and Olander references noted hereinbefore, as well as the methods of Loucks et al. described in copending U.S. Ser. No. 800,646, filed May 26, 1977. Illustrative polyphenylene oxides are described by the following formulae:

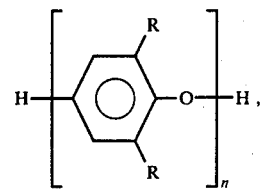

wherein independently each R is hydrogen, a hydrocarbon radical, a halohydrocarbon radical, a hydrocarbonoxy radical or a halohydrocarbonoxy radical, n is a number of at least 10, preferably 40 to 170; and

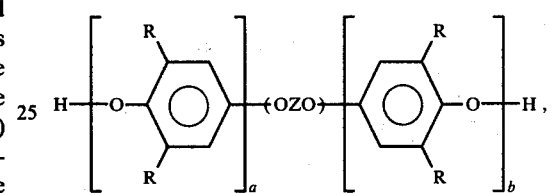

wherein independently each $-\!\!+\!OZO\!+\!\!-$ is a divalent quinone residue, Z is a divalent arene radical, either a or b is at least equal to 1, the sum of a plus b is preferably at least equal to 10, more preferably 40 to 170, and R is the same as defined in formula (I) above.

The heterocyclic halides that are employed in our process have at least two halide coupling reaction sites. The term "heterocyclic halide" includes any halo substituted nitrogen containing heterocyclic aromatic compound having at least two halogen atoms directly bonded to carbon atoms associated with an aromatic heterocyclic ring structure. An aromatic heterocyclic ring compound is defined herein as any heterocyclic ring structure in which carbon and nitrogen atoms are joined alternatively by one or by two pairs of shared electrons, i.e. heterocyclic compounds exhibiting a state of dynamic electron oscillation, sometimes referred to as resonance. The heterocyclic compounds can be monocyclic, polycyclic or fused polycyclic and can have two or more cyclic systems (monocyclic, polycyclic or fused polycyclic systems) which are directly joined to each other by single or double valence bonds, or by bi- or multivalent radicals. The heterocyclic rings can have any number of ring members, e.g. 3–10, or more, etc., and can have the halogen substituents located at any reactive position on these rings, for example in six membered rings at any ortho or para position, preferably ortho, relative to any of the ring nitrogen atoms. Presently preferred heterocyclic compounds are monocyclic systems having (a) 6 ring members, (b) 1–3 nitrogen ring members, (c) 3–5 carbon ring members, and (d) 1–3 chlorine ring substituents. Illustrative of presently preferred heterocyclic radicals and heterocyclic radical precursors are set out hereafter:

| | EQUIVALENTS FOR CYANURIC CHLORIDE X = Halo (Br, Cl, I) | | | |
|---|---|---|---|---|
| | Heterocyclic Radicals | | Heterocyclic Radical Precursors | |
| | Formulas | Name | Formulas | Name |
| III | 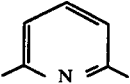 | 2,6-Pyridinediyl | 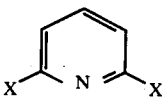 | 2,6-Dihalopyridine |
| IV | 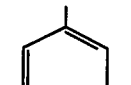 | 2,4,6-Pyridinetriyl | 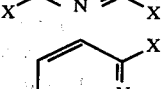 | 2,4,6-Trihalopyridine |
| V | 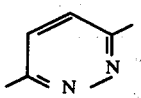 | 3,6-Pyridazinediyl | 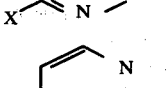 | 3,6-Dihalopyridazine |
| VI | 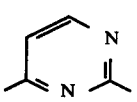 | 2,4-Pyrimidinediyl | 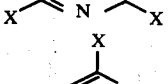 | 2,4-Dihalopyrimidine |
| VII | 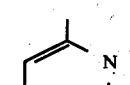 | 4,6-Pyrimidinediyl | 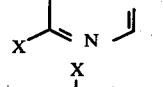 | 4,6-Dihalopyrimidine |
| VIII | 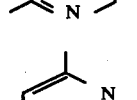 | 2,4,6-Pyrimidinetriyl | 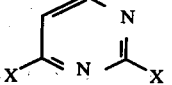 | 2,4,6-Trihalopyrimidine |
| IX | 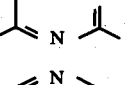 | 2,6-Pyrimidinediyl | 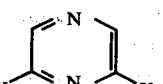 | 2,6-Dihalopyrazine |
| X | 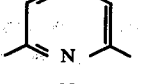 | 2,5-Pyrazinediyl | 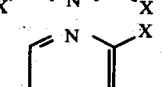 | 2,5-Dihalopyrazine |
| XI | 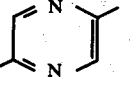 | 2,3,6-Pyrazinetriyl | 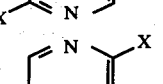 | 2,3,6-Trihalopyrazine |
| XII | 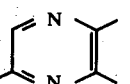 | 2,3,5,6-Pyrazinetetrayl | 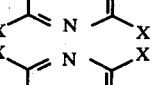 | 2,3,5,6-Tetrahalopyrazine |
| XIII | 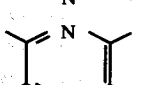 | 2,4-Triazinediyl | 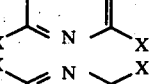 | 2,4-Dihalotriazine |
| XIV | 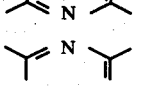 | 2,4,6-Triazinetriyl | 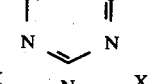 | Cyanuric halide |
| XV | 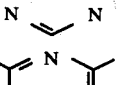 | Isoquinolinediyl | 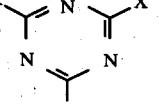 | Dihaloisoquinoline |
| XVI | 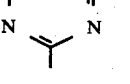 | 2,6-[7-methyl]purinediyl | | 2,6-Dihalo-7-methyl purine |

-continued
EQUIVALENTS FOR CYANURIC CHLORIDE
X = Halo (Br, Cl, I)

| Heterocyclic Radicals | | Heterocyclic Radical Precursors | |
|---|---|---|---|
| Formulas | Name | Formulas | Name |
| XVII | 1,4-Phthalazinediyl | | 1,4-Dihalophthalazine |

Illustrative of the broad group of heterocyclic-coupled polymers of polyphenylene oxides that can be prepared according to our process, among others, are those described by the following illustrative linear, branched and cross-linked polymer structures:

| | |
|---|---|
| (V linear) | AZA, AZB, BAB, AZBZA, AZBZB, BZBZB, etc. |
| (V branched) | B   B A    A A<br>AZA, AZBZA, AZBZA, etc. |
| (V cross-linked) | A<br>A       Z<br>AZBZBZA, AZBZBZ, etc.<br>B  B   B   A<br>AZBZBZBZA AZBZBZA<br>A  A | wherein A represents a monovalent phenoxy radical of a polyphenylene oxide of formula (I), B represents a divalent phenoxy radical of a quinone-coupled polyphenylene oxide of formula (II), and Z represents a di-, tri- or tetra-valent heterocyclic radical of a heterocyclic halide of formulas (III) to (XVII), among many others. The above illustrative linear branched cross-linked combinations of monovalent phenoxy radicals, divalent phenoxy radicals, and di-, tri-, and/or tetrafunctional heterocyclic radicals are not intended to limit the combinations that can be obtained by the practice of this invention since such combinations are limited only by the stoichiometric amounts of the representative precursors of the various radicals charged to the reaction medium in carrying out the process of this invention.

In general, our process is carried out by introducing a heterocyclic halide to a solution of a polyphenylene oxide under fluid mixing conditions wherein the solution experiences high fluid shear stress since our process is highly sensitive to the dispersion of the reactants. In a preferred embodiment, the coupling reaction is carried out while introducing the heterocyclic halide to the polyphenylene oxide solution at a point or region within a reaction environment near a mixing impeller, e.g. an axial-flow or radial flow impeller, such as a marine-type mixing propeller, fan turbine, pitched paddle, curved blade turbine, spiral backswept turbine, flat-blade turbine, gate impeller, anchor impeller, etc., in order to establish and maintain high fluid shear rates and accordingly relatedly high fluid shear stresses. The addition of heterocyclic halide under the aforesaid process conditions facilitates the establishment and maintenance of a substantially uniform dispersion of reactants, e.g. heterocyclic halide, quinone-coupled polyphenylene oxide, water soluble base, catalytic phase transfer agent, etc. and accordingly optimum process efficiency. In general, high-speed axial-flow impeller mixers are presently preferably in our process.

Advantageously and preferably, our process can be carried out employing substantially the exact stoichiometric amounts of heterocyclic halide required to completely couple essentially all of the polyphenylene oxide reactant while obtaining optimum increases in the heterocyclic-coupled polyphenylene oxide intrinsic viscosity. Preferably the heterocyclic halide is added to the reaction medium continuously during the course of the reaction so that the exact stoichiometric heterocyclic halide requirements for completion of the coupling reaction are only satisfied as the last portion of heterocyclic halide is added to the reaction medium.

In a preferred embodiment, our process is carried out in the substantial absence of any hydrolyzing agent, e.g. water methanol, etc., or other chemical constituents which can promote undesirable side reactions, such as primary or secondary amines. Accordingly, it is highly desirable that the individual and preferably the collective water, methanol, etc., primary and secondary amine content be limited to less than 1%, and more preferably less than ½% based on the weight of polyphenylene oxide reactant.

The heterocyclic halide coupling reaction is carried out in the presence of water soluble base, preferably in solution in an aqueous phase. The water soluble base can be any water soluble base which, in the presence of polyphenylene oxides, can convert substantially all of the hydroxy groups associated therewith to phenoxides, i.e. alkali metal or alkaline earth metal cation phenoxides or "onium" phenoxides derived from catalytic phase transfer agents described in greater detail later herein. Further illustrative of the bases that can be employed are alkali metal or alkaline earth metal hydroxides and carbonates, e.g. potassium hydroxide sodium hydroxide, sodium monocarbonate, barium carbonate, etc. In general, any amount of water soluble base can be employed, e.g. 0.1 to about 1000, preferably 1 to about 20, and more preferably 1.5 to about 5 moles of base per hydroxyl group associated with the polymers as identified by hydroxyl group infrared absorption at 3610 cm.$^{-1}$ based on a 2.5% solution in a $CS_2$ over a 1 cm. path calibrated against $CS_2$ in a matched cell. Further, preferably, the water soluble base is employed in solution in an aqueous phase wherein the water soluble base content is at least 10% and more preferably at least 25–50% by weight of the aqueous base solution. Preferably the heterocyclic halide coupling reaction is carried out in the presence of a catalytic phase transfer agent. The agent can be any phase transfer agent known to those skilled in the art, e.g. quaternary ammonium compounds, quaternary phosphonium, tertiary sulfonium compounds, etc., incuding mixtures thereof. Presently preferred phase transfer agents can be described by the formulae:

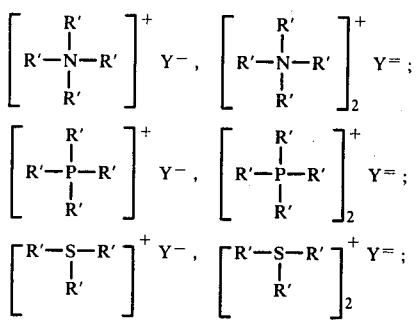

wherein each R' is independently selected from aliphatic hydrocarbon radicals having from about 1 to about 30 carbon atoms, preferably from about 2 to about 15 carbon atoms, each $Y^-$ is selected from the group consisting of $Cl^-$, $Br^-$, $F^-$, $CH_3SO_3^-$, $CH_3CO_2^-$, $CF_3CO_2^-$ or $OH^-$, and each $Y^{--}$ is selected from the group consisting of $SO_4^{--}$, $CO_3^{--}$, or $C_2O_4^{--}$. The catalytic phase transfer agents can also be employed in any amount, e.g. in amounts of from 0.001 to 10, preferably from 0.01 to 1.0, and more preferably from 0.05 to 0.5 moles based on the molar amounts of hydroxyl groups associated with the polymer.

Broadly, reaction time can be any time, e.g. 1/10 hour or less, to 10 hours, or more. Broadly, the reaction temperature can be any temperature, e.g. 0° C. or less to 150° C. or more. Broadly, the reaction pressures can be any pressure, e.g. subatmospheric, atmospheric or superatmospheric. Preferably, the reaction is carried out under optimum time, temperature and pressure reaction conditions which integrates substantially all, e.g. 90–99% or more of the heterocyclic halide contained within the reaction medium into the polymer backbone during the process. Broadly, the heterocyclic-coupled quinone-coupled polyphenylene oxides can be isolated from the reaction medium by any means employed heretofore to isolate the polymer produced by the processing of Hay and Orlander. Preferably, heterocyclic-coupled quinone-coupled polyphenylene oxide products of our process are isolated from the reaction medium by spray drying, steam precipitation or any other method which avoid costly distillation procedures involving the separation by distillation of mixed solvents.

EXAMPLE I

(A) Polymer Preparation

A 2.5 gallon stainless steel reactor equipped with an air-driven paddle stirrer, oxygen inlet tube, and water-cooled coil and jacket was charged with 6.615 l. toluene, 4.725 g. cupric chloride, 7.23 g. sodium bromide, 34.65 ml. N,N-dimethylbutylamine (DMBA), and 41.25 ml. di(n-butyl)amine (DBA). Oxygen was bubbled through the reaction medium at a rate of 8 SCFH with vigorous mixing. 1500 g. 2,6-xylenol, also known as 2,6-dimethylphenol, in 1500 ml. of toluene was pumped into the reactor over a 41 minute period. The reaction temperature was maintained at 25° C. throughout the monomer addition and the ensuing polymerization. Summarily, the reaction parameters relative to molar ratios of 2,6-xylenol:Cu:DMBA:DBA:Br were as follows: 350:1:7:7:2.

(B) Catalyst Deactivation, and (C) Quinone Coupling

After a total reaction time of 112 minutes, the oxygen was purged by nitrogen which was bubbled through the reaction mixture. The reaction mixture was maintained under a nitrogen purge for two hours during which time it was transferred to the coupling reactor by pumping through interconnecting stainless steel tubing and heated to a temperature of about 50° C.

(D) Coupling With Cyanuric Chloride 30 ml. of a 10% Aliquat ® 336 in toluene and 81.7 g. of an aqueous 50% sodium hydroxide solution was added to the resulting reaction mixture obtained as described in (C) above contained in 2.5 gallon stainless steel reactor equipped with a nitrogen inlet tube, thermocouples and a "Polytron" homogenizer mixing head. After stirring for 12 minutes under nitrogen at 1200 r.p.m., 25.3 g. crystalline cyanuric chloride was added as a slurry in 200 ml. toluene over a 20 minute period while stirring was continued. After a total reaction time of one hour, the reaction mixture was diluted with an equal volume of toluene and the polymer was precipitated from the stirred solution by the addition of two volumes of methanol. The polymer was washed with methanol and then dried at 80° C. in a circulating air oven.

The intrinsic viscosity of the quinone coupled polymer was 0.24 dl./g. (measured in chloroform at 25°) and 0.52 dl./g. after cyanuric chloride coupling. The phenolic hydroxyl absorbance at 3610 cm.$^{-1}$ based on a 2.5% solution in $CS_2$ over a 1 cm. path calibrated against $CS_2$ in a matched cell decreased from a value of 0.390 to 0.021 as a result of the cyanuric chloride coupling.

EXAMPLE II

Under a nitrogen atmosphere, a reaction mixture containing 8.25 g. of a poly-2,6-dimethylphenylene oxide powder—which had been isolated from the oxidative coupling polymerization of 2,6-xylenol with a manganese(II) benzoin oxime catalyst and having an intrinsic viscosity of 0.24 dl./g.—Aliquat ® 336 (0.41 ml. of a 10% solution for chlorobenzene), and 25 ml. chlorobenzene was contacted with 0.484 g. of a 50% aqueous sodium hydroxide solution. The mixture was stirred with a Vibromixer stirrer for 10 minutes. Solid cyanuric chloride (0.148 g.) was added over a 15 minute period and the mixture was stirred one hour more. The reaction mixture was diluted with 25 ml. chlorobenzene. Methanol was added to precipitate the heterocyclic-coupled polymer. After washing and drying at 80° C. the polymer weighed 8.0 g. The changes in viscosity and hydroxyl absorbance are listed in Table I below:

TABLE I

| Sample | [η] | OH Absorbance at 3610 cm.$^{-1}$ |
|---|---|---|
| Initial polymer | 0.24 dl./g. | 0.253 |
| Coupled polymer | 0.60 | 0.016 |

The reaction was repeated using 0.074 g. cyanuric chloride instead of 0.148 g. The product had an intrinsic viscosity of 0.56 dl./g. and an OH absorbance at 3610 cm.$^{-1}$ of 0.032.

As illustrated by the foregoing examples, polyphenylene oxides can be coupled with heterocyclic-coupling agents to form high molecular weight polyphenylene oxides. Analogous results can be obtained wherein any heterocyclic compound, or chemical equivalent thereof as described broadly in the specification hereinbefore, is substituted for cyanuric chloride or wherein any catalytic phase transfer agent described hereinbefore is substituted for Aliquat ® 336 in the examples.

The heterocyclic-coupled polyphenylene oxides can have any intrinsic viscosity and any number average molecular weight $\overline{M}_n$. Presently preferred polymers generally have an $\overline{M}_n$ value of 5,000 to 60,000, more preferably 15,000 to 30,000, having generally corresponding intrinsic viscosities as measured in chloroform at 25° C. of 0.17 to 1.7, and 0.4 to 0.7, respectively.

The heterocyclic-coupled polymers can be employed in conjunction with other polymers, such as high-impact polystyrene, etc., e.g. in polymer blends similar to those described in Cizek U.S. Pat. No. 3,383,435 which describes polyphenylene oxide resin combinations well-known to those skilled in the art as Noryl ® resins. Noryl ® resins are described in further detail in "Encyclopedia of Polymer Science and Technology", entitled *Phenols, Oxidative Polymerization*, Vol. 10, published by Interscience Publishers (1969).

The polymers of this invention can be combined with other filters, modifying agents, etc., such as dies, pigments, stabilizers, flame retardant additives with beneficial results.

We claim:

1. A process of forming heterocyclic-coupled polyphenylene oxides which comprises contacting in a high fluid stress reaction medium a carbon and nitrogen ring containing aromatic heterocyclic halide having at least two halogen atoms directly bonded to heterocyclic ring carbon atoms with a polyphenylene oxide having an average hydroxyl group per molecule value (a) a than zero including 1.0 or less, and/or (b) a quinone-coupled polyphenylene oxide having an average hydroxyl group per molecule value greater than zero including 2.0 or less.

2. The claim 1 process, wherein at least two of the aromatic heterocyclic ring carbon atoms are singly and directly bonded to a halogen atom, wherein the polyphenylene oxide is of the formulae:

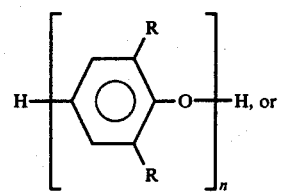

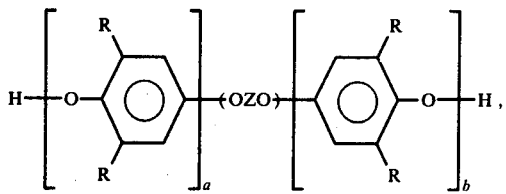

wherein independently each R is hydrogen, a hydrocarbon radical, a halohydrocarbon radical, a hydrocarbonoxy radical or a halo-hydrocarbonoxy radical, n is a number of at least 10, either a or b is at least equal to 1, the sum of a plus b is at least equal to 10, —+OZO+— is a divalent quinone residue, and Z is a divalent arene radical.

3. The claim 2 process, wherein —+OZO+— is of the formula

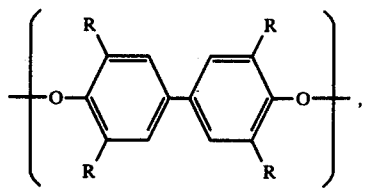

wherein independently each R is as defined hereinbefore.

4. The claim 3 process, wherein n is at least 10, and the sum of a plus b is at least 10.

5. The claim 4 process, wherein each R is hydrogen, a hydrocarbon, or a halohydrocarbon radical, n is a number of from 40 to 170 and the sum of a plus b is 40 to 170.

6. The claim 1 process, wherein each R is a methyl radical, and the heterocyclic halide is cyanuric chloride.

7. The claim 1 process, carried out in the substantial absence of a hydrolyzing agent.

8. The claim 7 process, carried out in the presence of water soluble base.

9. The claim 8 process, carried out in the presence of a catalytic phase transfer agent.

10. The claim 5 process, wherein the aromatic heterocyclic halide is monocyclic and contains six ring members, 1–3 nitrogen ring members, and 3–5 carbon ring members.

11. The claim 10 process, wherein the aromatic heterocyclic halide contains at least two nitrogen ring members.

* * * * *